(12) United States Patent
Zang et al.

(10) Patent No.: US 9,088,886 B1
(45) Date of Patent: Jul. 21, 2015

(54) USER DEMOGRAPHICS DETERMINATION BASED ON COMMONALITY IN CALL GRAPHS

(71) Applicant: Sprint Communications Company L.P., Overland Park, KS (US)

(72) Inventors: Hui Zang, Cupertino, CA (US); Yi Wang, Mountain View, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 208 days.

(21) Appl. No.: 13/800,503

(22) Filed: Mar. 13, 2013

(51) Int. Cl.
*H04M 15/00* (2006.01)
*H04M 11/00* (2006.01)
*H04W 4/26* (2009.01)

(52) U.S. Cl.
CPC ..................................... *H04W 4/26* (2013.01)

(58) Field of Classification Search
CPC ..... H04M 15/00; H04M 15/41; H04M 15/43; H04M 15/44

USPC .............. 379/114.01, 119, 121.05, 126, 133; 455/405–408
See application file for complete search history.

(56) References Cited

U.S. PATENT DOCUMENTS

| 7,346,471 B2 | 3/2008 | Chickering et al. | |
| 2013/0066933 A1* | 3/2013 | Mendiratta et al. | 708/208 |
| 2014/0119522 A1* | 5/2014 | Phadke et al. | 379/133 |

* cited by examiner

*Primary Examiner* — Quoc D Tran

(57) ABSTRACT

A method of operating a data processing system to infer demographic information for a user of a wireless communication device comprises processing a plurality of call detail records (CDRs) to generate a plurality of call graphs having different time slices based on time ranges when data in the CDRs was collected, wherein the call graphs comprise nodes that represent individual callers and edges between the nodes that represent bi-directional communication between the individual callers. The method further comprises identifying neighbors of the user that have a high likelihood of sharing a common demographic attribute with the user based on communication features and structural features among the neighbors on one of the call graphs. The method further comprises identifying a most similar neighbor among the neighbors of the user that has a highest likelihood of sharing the common demographic attribute with the user.

16 Claims, 5 Drawing Sheets

CALL GRAPH 400

USER DEMOGRAPHICS DETERMINATION BASED ON COMMONALITY IN CALL GRAPHS

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. Wireless communication networks generate user data related to the wireless communication services provided to the users of the wireless communication devices. The user data identifies these users and the number, size, and time of their wireless communications, among other information. This user data is often used for billing and performance management and may also be mined for network planning and design. The user data may also be used for marketing purposes. In some cases, the user data may be complied and assimilated into call detail records (CDRs).

Customer knowledge is important for effective marketing. For example, customer knowledge is often used to target advertising to the customer based on customer-specific information. Thus, knowledge of a customer's demographic information can be very desirable to ascertain. For example, a wireless communication network may offer different types of services to different users based on their home location, age, gender, income level, political affiliations, and other demographic attributes. The wireless network may also want to target advertising at users that fall into particular demographics. However, the communication data that is collected does not provide a clear indication of the demographic attributes of the users.

Overview

A method of operating a data processing system to infer demographic information for a user of a wireless communication device is disclosed. The method comprises processing a plurality of call detail records (CDRs) to generate a plurality of call graphs having different time slices based on time ranges when data in the CDRs was collected, wherein the call graphs comprise nodes that represent individual callers and edges between the nodes that represent bi-directional communication between the individual callers. The method further comprises identifying neighbors of the user that have a high likelihood of sharing a common demographic attribute with the user based on communication features and structural features among the neighbors on one of the call graphs. The method further comprises identifying a most similar neighbor among the neighbors of the user that has a highest likelihood of sharing the common demographic attribute with the user.

A computer apparatus to infer demographic information for a user of a wireless communication device comprises software instructions and at least one non-transitory computer-readable storage medium storing the software instructions. The software instructions are configured, when executed by a data processing system, to direct the data processing system to process a plurality of call detail records (CDRs) to generate a plurality of call graphs having different time slices based on time ranges when data in the CDRs was collected, wherein the call graphs comprise nodes that represent individual callers and edges between the nodes that represent bi-directional communication between the individual callers. The software instructions are further configured to direct the data processing system to identify neighbors of the user that have a high likelihood of sharing a common demographic attribute with the user based on communication features and structural features among the neighbors on one of the call graphs.

The software instructions are further configured to direct the data processing system to identify a most similar neighbor among the neighbors of the user that has a highest likelihood of sharing the common demographic attribute with the user.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
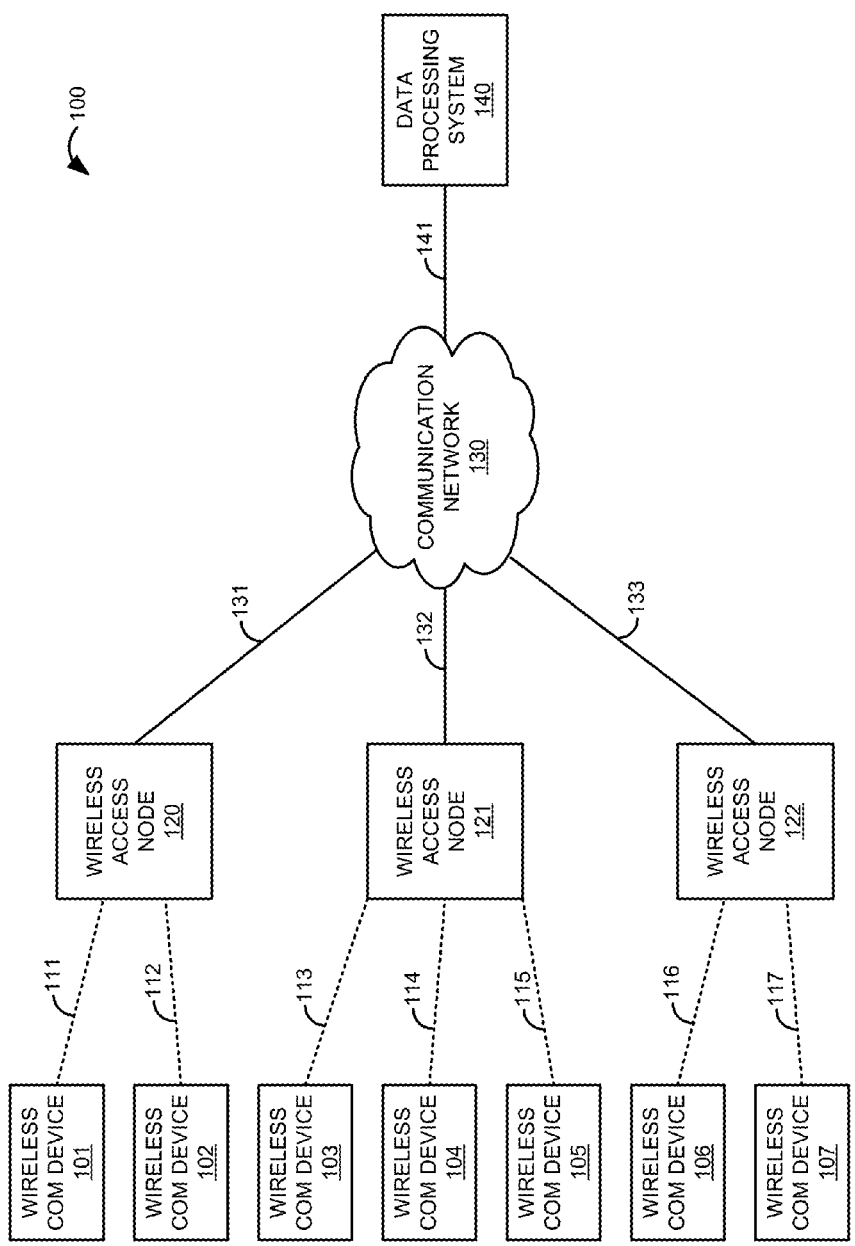
FIG. 1 is a block diagram that illustrates a communication system.

FIG. 1 is a block diagram that illustrates communication system 100. Note that communication system 100 is simplified for clarity, and system 100 may have millions of additional users, devices, and access nodes in some examples. Communication system 100 includes wireless communication devices 101-107, wireless access nodes 120-122, communication network 130, and data processing system 140. Wireless communication devices 101-102 and wireless access node 120 are in communication over respective wireless communication links 111 and 112. Likewise, wireless communication devices 103-105 and wireless access node 121 communicate over respective wireless communication links 113-115. Wireless communication devices 106-107 and wireless access node 122 are in communication over respective wireless communication links 116 and 117. Wireless access node 120 and communication network 130 communicate over communication link 131, wireless access node 121 and communication network 130 are in communication over communication link 132, and wireless access node 122 and communication network 130 communicate over communication link 133. Data processing system 140 and communication network 130 are in communication over communication link 141.

Figure 2:
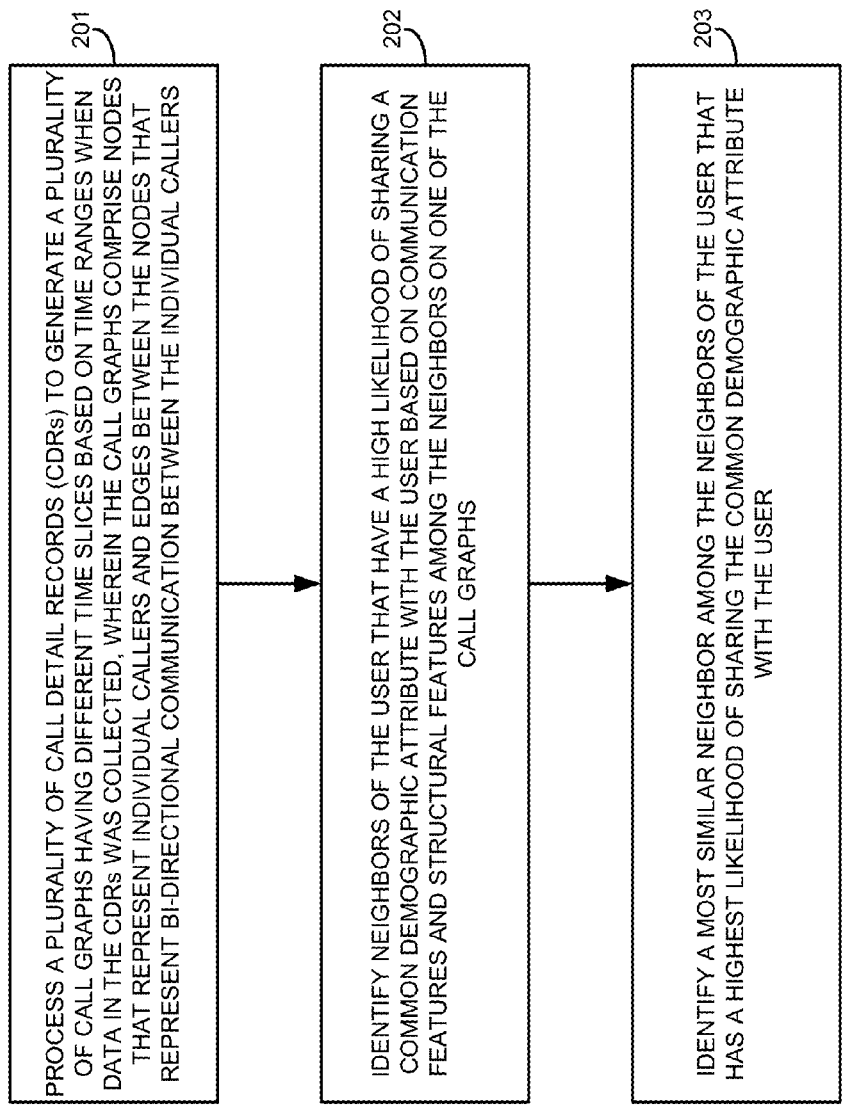
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by data processing system 140 to infer demographic information for a user of a wireless communication device.

To begin, data processing system 140 processes a plurality of call detail records (CDRs) to generate a plurality of call graphs having different time slices based on time ranges when data in the CDRs was collected, wherein the call graphs comprise nodes that represent individual callers and edges between the nodes that represent bi-directional communication between the individual callers (201). Note that the terms "call" and "callers" as used herein are intended to refer to any user communications, including the exchange of audio, video, and/or data messages, such as voice communications, short message service (SMS) text messages, multimedia messages, voicemail, email, and any other form of user communications.

Typically, the call graphs having the different time slices based on the time ranges when the data in the CDRs was collected comprise a weekday call graph, a nights and weekends call graph, and a complete call graph, although other time ranges are also possible and within the scope of this disclosure. In some examples, the weekday time slice that defines the weekday call graph could include data collected on Monday through Friday from 9:00 am to 6:00 pm, the nights and weekends time slice could include data collected on Monday through Friday from 9:00 pm to 8:00 am and all hours on Saturday and Sunday, and the complete call graph could be constructed from data collected at all hours of all days of the week. The call graphs comprise nodes that represent individual callers and edges between the nodes that represent bi-directional communication between the individual callers, where bi-directional communication is defined where both callers connected by an edge have initiated contact to the other independently. Bi-directional communication is analyzed because this type of reciprocity has typically been shown to provide a good indication of a strong relationship between the callers. The edges between the nodes could include several features, including a number of calls between the nodes, an average call duration of the calls, a degree difference between the nodes that represents a difference between a total number of contacts with which each node communicates, and a number of common contacts between the nodes. Additional features may also be attributed to the edges in some examples. The average of all the features over all edges may be calculated for call graphs over an entire network to provide macro-level caller statistics in some examples.

Once the call graphs are generated, data processing system 140 identifies neighbors of a user that have a high likelihood of sharing a common demographic attribute with the user based on communication features and structural features among the neighbors on one of the call graphs (202). Typically, neighbors are defined as any two nodes that have engaged in bi-directional communication and are thus connected by an edge in a call graph. In some examples, the common demographic attributes could comprise a similarity of a home location of the user and the neighbors, a similarly of an age of the user and the neighbors, a similarly of an income level of the user and the neighbors, and any other demographic attributes the user's neighbors could have in common with the user. In some examples, a similarity of a home location of the user and a neighbor could be defined as the closeness or proximity in geographical distance between the home location of the user and a home location of the neighbor. The communication features and structural features among the neighbors of a particular user on a call graph may be used to identify those neighbors of the user that have a high likelihood of sharing a common demographic attribute with the user. For example, the formation of an edge between two contacts typically has an inverse relationship with home distance, meaning that a majority of the neighbors of a user reside within a close proximity of the user, such as less than one hundred kilometers. In another example, the communication features and structural features among the neighbors of a user could indicate that the user has a greater than fifty percent chance of contacting users having a similar age of the user. Likewise, there is typically a greater than fifty percent chance that a user will contact other users having a similar income level to that of the user. Other demographic information may be analyzed and other techniques of identifying neighbors of a user that have a high likelihood of sharing a common demographic attribute with the user are also possible and within the scope of this disclosure.

Data processing system 140 identifies a most similar neighbor among the neighbors of the user that has a highest likelihood of sharing the common demographic attribute with the user (203). Typically, data processing system 140 analyzes communication features between neighbors in the call graph to identify the most similar neighbor among the neighbors of the user that has the highest likelihood of having a particular demographic attribute in common with the user. For example, data processing system 140 could identify the most similar neighbor among the neighbors of the user that has the highest likelihood of sharing the similarity of the home location with the user by identifying a neighbor that has a shortest average call duration with the user and a greatest number of common contacts shared with the user. In some examples, the most similar neighbor among the neighbors of the user that has the highest likelihood of sharing the similarly of the age of the user could be identified as a neighbor that has a greatest number of weekday calls with the user, a neighbor that has a shortest average call duration with the user, and/or a neighbor that has a greatest number of common contacts shared with the user during weekdays—including combinations thereof. In fact, the neighbor that has the strongest correlation of these three factors combined is typically identified as the most similar neighbor among the neighbors of the user that has the highest likelihood of sharing the similarly of the age of the user. Typically, the neighbor that has the highest likelihood of having an income level in common with the user could be identified by the same caller features as those used to determine the most similar neighbor that has the highest likelihood of sharing the similarly of the age of the user. Additional and/or alternative caller features could also be used to identify a most similar neighbor among the neighbors of the user that has a highest likelihood of sharing a particular demographic attribute in common with the user.

Advantageously, the operation described above facilitates identifying neighbors of a user on a call graph that are likely to have demographic attributes in common with the user. Using both communication metrics and structural properties of the call graphs, specific contacts that engage in bi-directional communication with the user can be identified that have a high likelihood of sharing similar demographics with the user. In this manner, if the demographic attributes of a particular user are unknown, they can be inferred based on known demographic information of the user's neighbors that have been identified as having a high likelihood to share demographic attributes in common with the user.

Referring back to FIG. 1, wireless communication devices 101-107 individually comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101-107 may also include a user interface, memory system, software, processing circuitry, or some other communication components. For example, each wireless communication device 101-107 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101-107 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101-107 and their respective wireless access nodes 120-122.

Wireless access nodes 120-122 individually comprise RF communication circuitry and an antenna. The RF communication circuitry typically includes an amplifier, filter, RF modulator, and signal processing circuitry. Wireless access nodes 120-122 may also comprise a router, server, memory device, software, processing circuitry, cabling, power supply, network communication interface, structural support, or some other communication apparatus. Wireless access nodes 120-122 could each comprise a base station, Internet access node, telephony service node, wireless data access point, or some other wireless communication system—including combinations thereof. Some examples of wireless access nodes 120-122 include a base transceiver station (BTS), base station controller (BSC), radio base station (RBS), Node B, enhanced Node B (eNodeB), and others—including combinations thereof. Wireless network protocols that may be utilized by wireless access nodes 120-122 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Data processing system 140 comprises a processing system and communication transceiver. Data processing system 140 may also include other components such as a router, server, data storage system, and power supply. Data processing system 140 may reside in a single device or may be distributed across multiple devices. Data processing system 140 may be a discrete system or may be integrated within other systems—including other systems within communication system 100. In some examples, data processing system 140 could comprise a home agent, packet data serving node (PDSN), network switch, mobile switching center, router, switching system, packet gateway, network gateway system, Internet access node, application server, service node, firewall, or some other communication system—including combinations thereof.

Wireless communication links 111-117 use the air or space as the transport medium. Wireless communication links 111-117 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111-117 may each comprise many different signals sharing the same link. For example, wireless communication links 111-117 could each include multiple signals operating in a single propagation path comprising multiple communication sessions, frequencies, timeslots, transportation ports, logical transportation links, network sockets, IP sockets, packets, or communication directions—including combinations thereof.

Communication links 131-133 and 141 use metal, air, space, optical fiber such as glass or plastic, or some other material as the transport medium—including combinations thereof. Communication links 131-133 and 141 could use various communication protocols, such as TDM, IP, Ethernet, telephony, optical networking, hybrid fiber coax (HFC), communication signaling, wireless protocols, or some other communication format—including combinations thereof. Communication links 131-133 and 141 may each be direct links or could include intermediate networks, systems, or devices.

Figure 3:
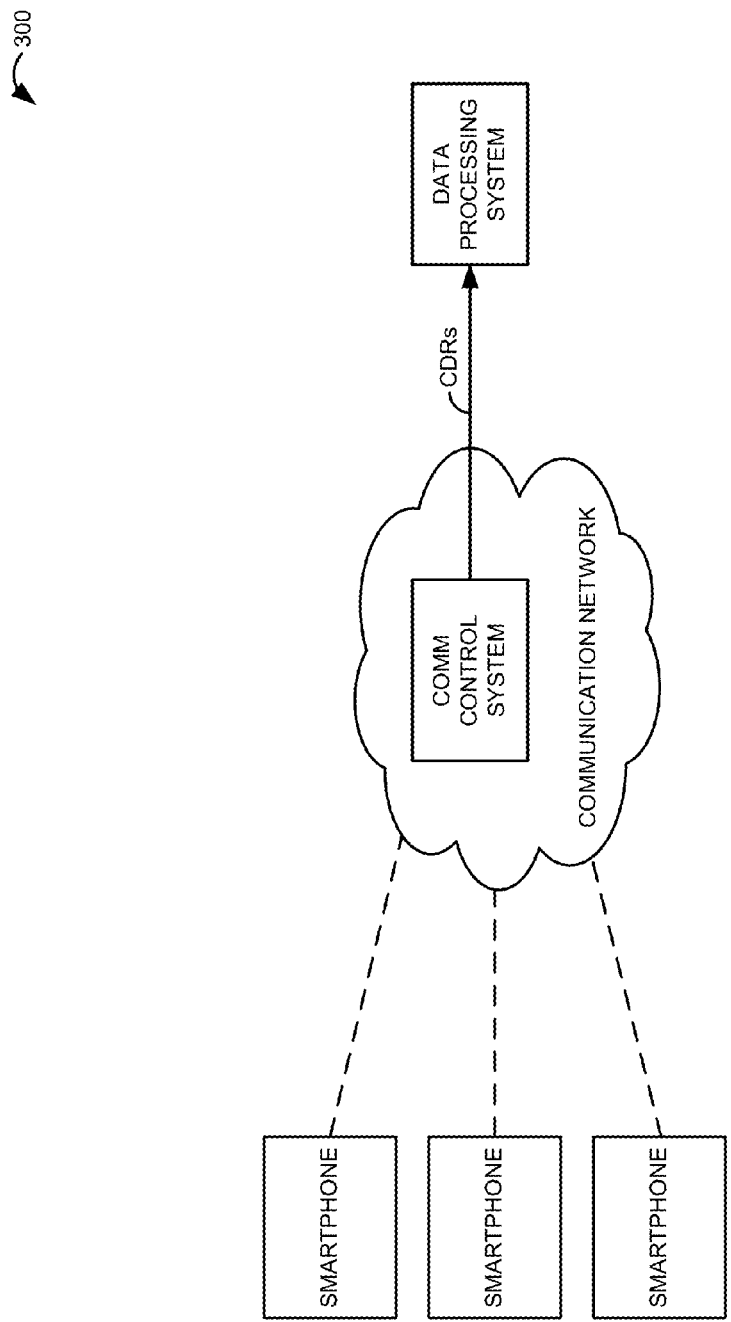
FIG. 3 is a block diagram that illustrates a communication system in an exemplary embodiment.

FIG. 3 is a block diagram that illustrates communication system 300 in an exemplary embodiment. Communication system 300 includes three smartphones in communication with a communication network. The communication network includes a communication control system. The communication control system and a data processing system are in communication over the communication network. The communication control system comprises computer and communication platforms that manage wireless communications among the smartphones, and also routes user communications between the smartphones.

In operation, the communication control system manages the communications between the smartphones and produces associated user data, such as user identifiers, communication times, communication durations, and the like. An exemplary set of user communication characteristics for wireless communications between users might comprise amount/number, origination-destination direction, timeframe, duration/data size, time interval between communications, and other pertinent user communication metrics. The communication control system complies all of these communication statistics and generates call detail records (CDRs) that are transmitted to the data processing system for processing.

The data processing system processes the CDRs to construct call graphs where the nodes are callers and the edges represent bi-directional communication pairs between the callers, meaning both users have independently initiated a call to one another. The call graphs may be based on different times when the data was collected, referred to as a time slice. For example, a weekday time slice that defines a weekday call graph could include data collected on Monday through Friday from 9:00 am to 6:00 pm, a night-weekend time slice could include data collected on Monday through Friday from 9:00 pm to 8:00 am and all hours on Saturday and Sunday, and a complete call graph could be constructed from data collected at all hours of all days of the week.

Various demographic attributes of a particular user may be identified from the user communication data and the structural features of the call graphs. For example, the age group of the user may be inferred from neighbors connected to the user by edges in a call graph, where age groups could be defined as 15-30, 31-45, 46-65, and over 66 years old. In another example, an income level of the user could be inferred from the call graphs, which could be defined by income ranges in dollar values in some examples.

The edges of a call graph are enhanced by attributing additional features to each edge, such as a number of calls between the two callers forming the edge, the average call duration of these calls, the degree difference between the callers, and the number of common contacts shared between the two callers. The degree of a particular caller could be defined as a total number of contacts with which the caller communicates, so that the degree difference between the callers could be defined as the absolute difference between the degrees of the two callers that form the edge. These edge features can be further broken down based on which type of call graph they are associated with. For example, when applied to the weekday and nigh-weekend graphs, eight different features result: number of weekday calls ($f_1$), number of night-weekend calls ($f_2$), average weekday call duration ($f_3$), average night-weekend call duration ($f_4$), weekday degree difference ($f_5$), night-weekend degree difference ($f_6$), number of weekday common contacts ($f_7$), and number of night-weekend common contacts ($f_8$).

To determine a likelihood of having a home location in common between two users, two probabilities may be defined and measured. First, $p_1(d)$ is defined as the probability that two users residing at a home distance d are connected by an edge, that is, $p_1(d)=p(Edge(u_i, u_j)||h_i-h_j|=d)$, where $u_i$ and $u_j$ are any two users on a call graph and $h_i$ and $h_j$ are their home locations. Second, given two users connected by an edge, $p_2(d)$ is defined as the probability that their home distance is d, that is, $p_2(d)=p(|h_i-h_j|=d|Edge(u_i,u_j))$. The $p_1$ and $p_2$ probabilities are plotted on the complete graph, and the distribution is approximated with a power-law distribution $y=ax^b$ for both curves. The resulting exponents suggest that the formation of an edge has an inverse correlation with home distance. Using the cumulative distribution function (CDF) of the $p_2(d)$, for a particular user, it is found that eighty percent of the user's neighbors reside less than one hundred kilometers from the user. The curves from the weekday and night-weekend graphs have similar patterns.

To determine whether users have a high probability of communicating with others in the same age group, the conditional probability that a subscriber $u_i$ of age a calls the other $u_j$ of age b on the complete graph is defined as $p(AGE(u_j)=b|AGE(u_i)=a)$. The probabilities of all the combinations for age groups a and b are calculated and it is found that users have more than a fifty percent chance of calling others of the same age among the four age groups. This finding is an indication of strong commonality between age groups. The weekday call graph exhibits slightly stronger commonality between age group communications than the night-weekend graph, suggesting that working relationships could favor same-age communication. Using similar analysis as above for age groups, it is also found that users with common income levels communicate at more than fifty percent probability.

A most similar neighbor among all neighbors of a user can also be predicted with high probability. To identify such correlations, linear regression is used to identify significant features for common demographic attributes over all possible pairs on the complete call graph. The following linear regression model is established to achieve this goal, where $\delta(u_i, u_j)$ is the distance of two homes $|h_i|h_j|$ for home location commonality:

$$\delta(u_i,u_j)=\Sigma_{x=1}^{8}\beta_x f_x(u_i,u_j)$$

In the above equation, $f_x$ may be defined by the eight features discussed above for edge features $f_1$ through $f_8$ For age and income demographic commonality, in some examples $\delta(u_i, u_j)$ is one if the age or income of a pair of users is the same and is otherwise zero, but in other examples, $\delta(u_i, u_j)$ could be represented numerically for age and income demographic commonality, such as an actual difference in age and/or income level.

Using the regression above, both average weekday and night-weekend call durations $f_1$ and $f_4$ and the number of weekday and night-weekend common contacts $f_7$ and $f_8$ are proven to be more significant than the others. These four features show statistical significance with p-value <0.05 under t-test. The regression coefficients reveal the following relationships between calling features and home distance of a communicating pair. First, the average call duration is positively correlated with home distance, meaning the greater the average call duration, the farther the distance between home locations. Second, the number of common contacts in weekday and night-weekend time slices is negatively correlated with home distance. For example, the average distance between the homes of a pair with five or more common contacts may be fifty kilometers, whereas the distance for a pair with fifteen or more common contacts could decrease to ten kilometers.

Regarding age commonality between a communicating pair, all eight features show statistical significance with p-value <0.05 except the number of night-weekend calls $f_2$ and the number of night-weekend common contacts $f_8$. The regression coefficients reveal the following relationships between calling features and age group of a communicating pair. First, the coefficient associated with the number of weekday calls indicates that users make more weekday calls to those of the same age group. For example, if two users have more than twenty weekday calls, the probability is as high as eighty percent that the pair is in the same age group. Second, the weekday and night-weekend call duration coefficients indicate that users on average make shorter-duration calls to those of the same age group. For example, calls with an average call duration of less than ten minutes on weekends have a fifty percent chance of happening between two users in the same age group. Finally, the coefficient associated with the number of weekday common contacts indicates that two users with more weekday contacts in common have a higher probability of being in the same age group. In some examples, when two users have more than one weekday or night-weekend common contact, the probability of the pair belonging to the same age group is as high as seventy five percent.

Regarding income level commonality between users, all the features show statistical significance with a p-value <0.05 except the number of night-weekend calls $f_2$. The correlations between features and income level are similar to those between the same features for age group commonality, and the regression coefficients have similar values.

Various algorithms could be employed to test the accuracy of the above predictions. For example, to assess the accuracy of predicting a home location of a user based on the home locations of the user's neighbors, a RANK approach could be used that orders the neighbors according to strength of similarity and labels the user in question as the most likely to be a similar neighbor. In particular, RANK uses linear regression as discussed above with carefully selected features. The RANK algorithm uses features of each target-neighbor pair to estimate the distance between the homes of the target and the neighbor, selects the nearest neighbor and returns the home location of that neighbor as the result. The reported accuracy of prediction is defined to be the median from distances between the inferred home location and the actual home location over all subscribers. The RANK algorithm reports an accuracy of 5.2 kilometers for the weekday graph, 5.1 kilometers for the night-weekend graph, and 4.0 kilometers for the complete graph, where features $f_3$ and $f_7$ are used for the weekday graph, $f_4$ and $f_8$ for the night-weekend graph, and all features are used for the complete graph.

A Maximum Likelihood (ML) algorithm is also used to test the accuracy of the home location predictions. Given the home locations of the neighbors N S, and where $p_1$ was defined above as the probability that two users residing at a home distance d are connected by an edge, the ML algorithm calculates the probability of each home h' by:

$$PX(h')=\Pi_{u_k \in NS} p_1(|h'-h_k|)\Pi_{u_k \in NS}(1-p_1(|h'-h_k|))$$

The above algorithm for ML picks the largest PX as the answer. Using this algorithm, it is determined that the complete call graph is better at home inference than the weekday and night-weekend graphs. The ML algorithm provides similar results as the RANK algorithm for home location prediction accuracy, with 5.1 kilometers for the weekday graph, 5.1 kilometers for the night-weekend graph, and 4.0 kilometers for the complete graph. A key advantage to the RANK algorithm is that RANK only needs the home location of the most likely neighbor, whereas ML requires many home locations. Therefore, the two algorithms may be equally useful under different scenarios. For example, if detailed call records are available with many communication features, but few home locations are known, RANK may be the most useful because it uses the information of the most likely neighbor, when known. But if a graph is available without accurate communication features, but many known home locations, ML might produce more accurate results.

To assess the accuracy of inferring an age group of a user, the RANK algorithm is used, as well as a Majority Vote (MAJ) algorithm. MAJ identifies the most common occurrence of a particular demographic attribute among the neighbors of the user, and uses that result to label the user in question. RANK uses the features of each target-neighbor pair to estimate the likelihood of their similarity, selects the most likely similar neighbor and returns its label as the answer. For inferring the accuracy of the age group prediction using the RANK algorithm, the features $f_1$, $f_3$, $f_5$, and $f_7$ are used for the weekday graph, $f_4$ and $f_6$ for the night-weekend graph, and all features for the complete graph. The accuracy is defined as the ratio of the number of subscribers with correctly inferred age over the total number.

After running the RANK and MAJ algorithms for age group inferences, it is found that the accuracy of RANK is comparable to MAJ, within a one percent difference. The RANK algorithm reports an accuracy of 77% for the weekday graph, 64% for the night-weekend graph, and 71% for the complete graph. By comparison, the MAJ algorithm reports an accuracy of 78% for the weekday graph, 65% for the night-weekend graph, and 72% for the complete graph. From these results, it is shown that the weekday graph yields better results than the night-weekend graph for age group predictions. The effect of different user degrees is also analyzed (recall that the degree of a particular user could be defined as a total number of contacts with which the user communicates). Using the complete graph, the RANK algorithm outperforms MAJ on low-degree users having fewer than seven communicating contacts, but MAJ is superior when considering higher-degree users. Thus, the two algorithms could be used synergistically, where RANK could be employed for users with low degree and MAJ can be used for higher degree nodes. Regarding income level predictions, the results are found to be very similar to the age group inferences, where the weekday graph is again better at income inference than the night-weekend graph or the complete graph, RANK is more suitable for low-degree users having fewer than ten communicating contacts, and MAJ is better for higher-degree users.

The techniques and algorithms described above facilitate quantifying the extent of common demographic attributes between neighbors on a call graph and can be used to accurately correlate these attributes among pairs of communicating users based on their communication metrics and structural features apparent in the call graph. Advantageously, an effective approach to infer demographic information for a user of a wireless communication device is achieved through linear regression to select the most similar neighbor of the user that has the highest likelihood of sharing a common demographic attribute with the user. This inferred demographic information can then be used for advertising, market research, and other purposes.

Figure 4:
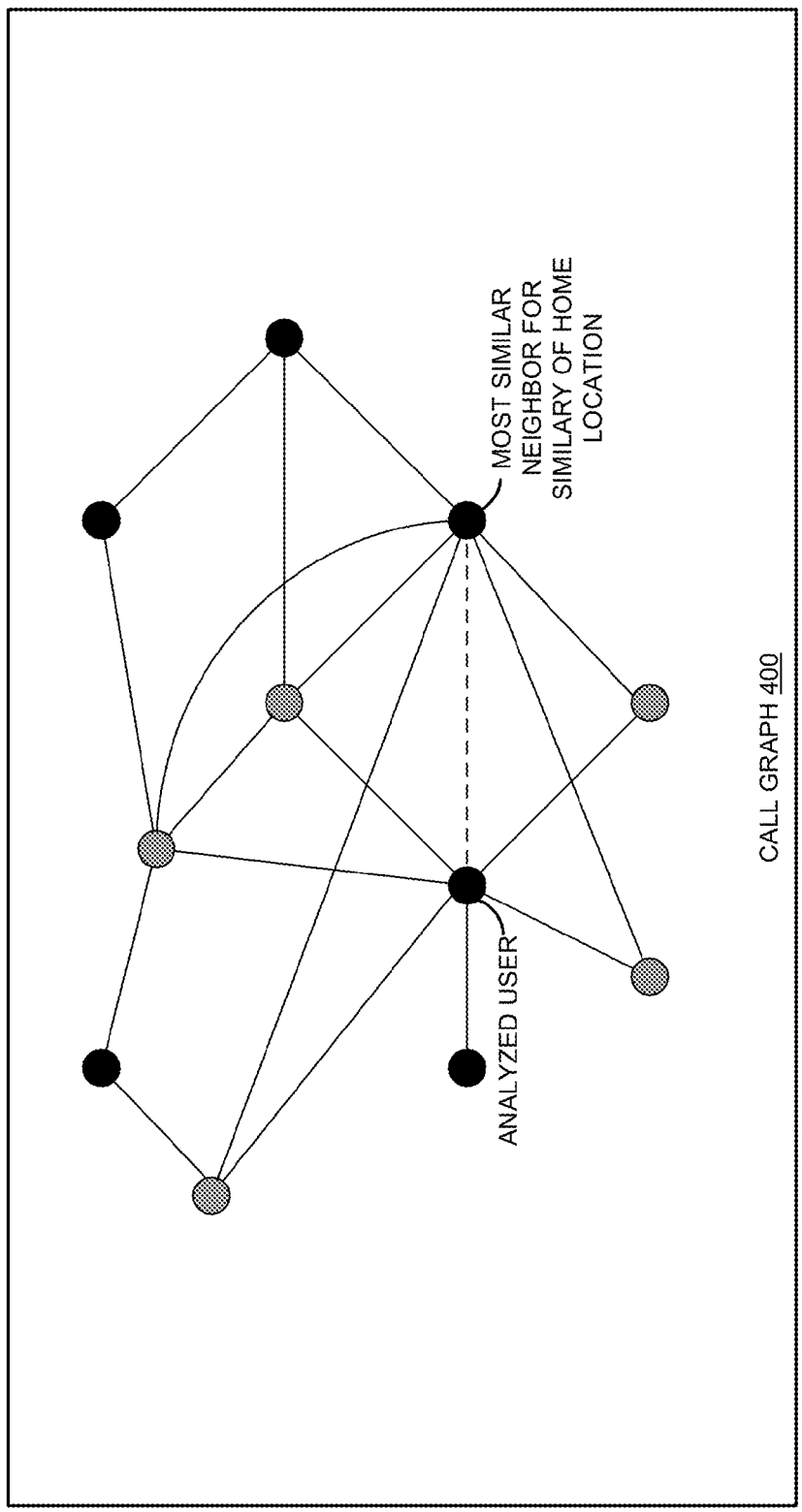
FIG. 4 is a call graph diagram that may be used to determine a most similar neighbor of a user for a home location attribute in an exemplary embodiment.

FIG. 4 is a call graph diagram that may be used to determine a most similar neighbor of a user for a home location attribute in an exemplary embodiment. The call graph 400 shown in FIG. 4 includes several nodes that represent different users of a communication network, as shown by the black and gray circles. The nodes are connected by lines to form edges between the nodes, where an edge represents a bi-directional communication pair between the callers, meaning both users have independently initiated a call to one another.

In call graph 400, one of the nodes is labeled as an "analyzed user," where another node is labeled as the "most similar neighbor for similarity of home location." In this example, the five gray-colored nodes are contacts that both the analyzed user and the most similar neighbor have in common, and are highlighted in gray to clearly depict this commonality between these users. In other words, both the analyzed user and the most similar neighbor have engaged in bi-directional communication with the users represented by the five gray-colored nodes. The dashed line appearing between the analyzed user and the most similar neighbor is intended to show that the analyzed user has the shortest average call duration with the most similar neighbor as compared to the average call durations of all other communications that the analyzed user has with all other users.

According to the above communication metrics and structural features of call graph 400, the analyzed user has the shortest average call duration with the most similar neighbor and a greatest number of common contacts shared with the analyzed user. Based on this information, the node labeled the most similar neighbor on call graph 400 can be identified as the most similar neighbor to the analyzed user for the home location attribute, meaning this most similar neighbor has the highest likelihood of having a similar home location to the analyzed user. In this manner, if the home location of this most similar neighbor is known, the home location of the analyzed user can be inferred to be within fifty kilometers of the home location of the most similar neighbor with a high degree of accuracy.

Figure 5:
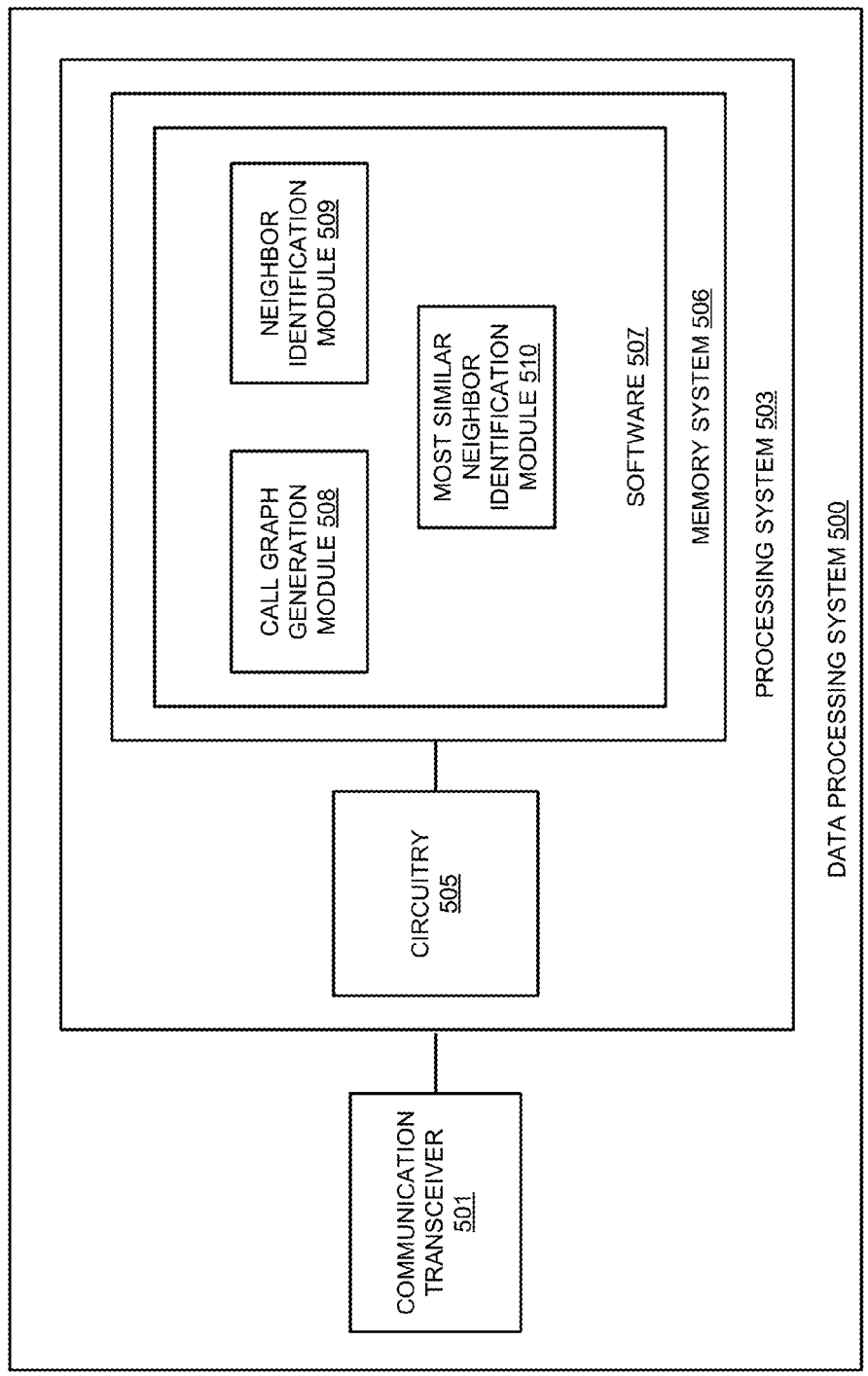
FIG. 5 is a block diagram that illustrates a data processing system.

FIG. 5 is a block diagram that illustrates data processing system 500. Data processing system 500 provides an example of data processing system 140, although system 140 may have alternative configurations. Data processing system 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-510.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-510, although software 507 could have alternative configurations in other examples.

When executed by circuitry 505, operating software 507 directs processing system 503 to operate as described herein for data processing system 140. In particular, operating software 507 may direct processing system 503 to process a plurality of call detail records (CDRs) to generate a plurality of call graphs having different time slices based on time ranges when data in the CDRs was collected, wherein the call graphs comprise nodes that represent individual callers and edges between the nodes that represent bi-directional communication between the individual callers. Operating software 507 further directs processing system 503 to identify neighbors of a user that have a high likelihood of sharing a common demographic attribute with the user based on communication features and structural features among the neighbors on one of the call graphs. Finally, operating software 507 directs processing system 503 to identify a most similar neighbor among the neighbors of the user that has a highest likelihood of sharing the common demographic attribute with the user.

In this example, operating software 507 comprises a call graph generation software module 508 that processes a plurality of call detail records (CDRs) to generate a plurality of call graphs having different time slices based on time ranges when data in the CDRs was collected, wherein the call graphs comprise nodes that represent individual callers and edges between the nodes that represent bi-directional communication between the individual callers. In addition, operating software 507 comprises a neighbor identification software module 509 that identifies neighbors of a user that have a high likelihood of sharing a common demographic attribute with the user based on communication features and structural features among the neighbors on one of the call graphs. Operating software 507 also comprises a most similar neighbor identification software module 510 that identifies a most similar neighbor among the neighbors of the user that has a highest likelihood of sharing the common demographic attribute with the user.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data processing system to infer demographic information for a user of a wireless communication device, the method comprising:

processing a plurality of call detail records (CDRs) to generate a plurality of call graphs having different time slices based on time ranges when data in the CDRs was collected, wherein the call graphs comprise nodes that represent individual callers and edges between the nodes that represent bi-directional communication between the individual callers;

identifying neighbors of the user that have a high likelihood of sharing a common demographic attribute with the user based on communication features and structural features among the neighbors on one of the call graphs, wherein the common demographic attribute comprises a similarity of a home location of the user and the neighbors; and identifying a most similar neighbor among the neighbors of the user that has a highest likelihood of sharing the common demographic attribute with the user by at least identifying a neighbor that has a shortest average call duration with the user and a greatest number of common contacts shared with the user.

2. The method of claim 1 wherein the call graphs having the different time slices based on the time ranges when the data in the CDRs was collected comprise a weekday call graph, a nights and weekends call graph, and a complete call graph.

3. The method of claim 1 wherein the edges between the nodes include a number of calls between the nodes, an average call duration of the calls, a degree difference between the nodes that represents a difference between a total number of contacts with which each node communicates, and a number of common contacts between the nodes.

4. The method of claim 1 wherein the common demographic attribute further comprises a similarly of an age of the user and the neighbors.

5. The method of claim 4 wherein identifying the most similar neighbor among the neighbors of the user that has the highest likelihood of sharing the similarly of the age of the user comprises identifying a neighbor that has a greatest number of weekday calls with the user.

6. The method of claim 4 wherein identifying the most similar neighbor among the neighbors of the user that has the highest likelihood of sharing the similarly of the age of the user comprises identifying a neighbor that has a shortest average call duration with the user.

7. The method of claim 4 wherein identifying the most similar neighbor among the neighbors of the user that has the highest likelihood of sharing the similarly of the age of the user comprises identifying a neighbor that has a greatest number of common contacts shared with the user during weekdays.

8. The method of claim 1 wherein the common demographic attribute comprises a similarly of an income level of the user and the neighbors.

9. A computer apparatus to infer demographic information for a user of a wireless communication device, the apparatus comprising:
software instructions configured, when executed by a data processing system, to direct the data processing system to:
process a plurality of call detail records (CDRs) to generate a plurality of call graphs having different time slices based on time ranges when data in the CDRs was collected, wherein the call graphs comprise nodes that represent individual callers and edges between the nodes that represent bi-directional communication between the individual callers;
identify neighbors of the user that have a high likelihood of sharing a common demographic attribute with the user based on communication features and structural features among the neighbors on one of the call graphs, wherein the common demographic attribute comprises a similarly of an age of the user and the neighbors; and
identify a most similar neighbor among the neighbors of the user that has a highest likelihood of sharing the common demographic attribute with the user by at least identifying a neighbor that has a shortest average call duration with the user; and
at least one non-transitory computer-readable storage medium storing the software instructions.

10. The computer apparatus of claim 9 wherein the call graphs having the different time slices based on the time ranges when the data in the CDRs was collected comprise a weekday call graph, a nights and weekends call graph, and a complete call graph.

11. The computer apparatus of claim 9 wherein the edges between the nodes include a number of calls between the nodes, an average call duration of the calls, a degree difference between the nodes that represents a difference between a total number of contacts with which each node communicates, and a number of common contacts between the nodes.

12. The computer apparatus of claim 9 wherein the common demographic attribute further comprises a similarity of a home location of the user and the neighbors.

13. The computer apparatus of claim 12 wherein the software instructions configured to direct the data processing system to identify the most similar neighbor among the neighbors of the user that has the highest likelihood of sharing the similarity of the home location with the user comprises the software instructions configured to direct the data processing system to identify a neighbor that has a shortest average call duration with the user and a greatest number of common contacts shared with the user.

14. The computer apparatus of claim 9 wherein the software instructions configured to direct the data processing system to identify the most similar neighbor among the neighbors of the user that has the highest likelihood of sharing the similarly of the age of the user comprises the software instructions configured to direct the data processing system to identify a neighbor that has a greatest number of weekday calls with the user.

15. The computer apparatus of claim 9 wherein the software instructions configured to direct the data processing system to identify the most similar neighbor among the neighbors of the user that has the highest likelihood of sharing the similarly of the age of the user comprises the software instructions configured to direct the data processing system to identify a neighbor that has a greatest number of common contacts shared with the user during weekdays.

16. The computer apparatus of claim 9 wherein the common demographic attribute comprises a similarly of an income level of the user and the neighbors.

* * * * *